3,150,121
MOLTEN PHASE EXTRACTION OF POLYMERIC OLEFINS

Richard W. Quarles, Princeton, N.J., and Lloyd H. Wartman, Charleston, W. Va., assignors to Union Carbide Corporation, a corporation of New York
No Drawing. Original application Nov. 10, 1959, Ser. No. 851,979, now Patent No. 3,088,936, dated May 7, 1963. Divided and this application Dec. 12, 1962, Ser. No. 244,015
6 Claims. (Cl. 260—88.2)

This invention relates in general to a process for purifying polymeric olefins and more particularly it relates to a novel process for extracting low molecular weight polymer fractions from polyolefins in the molten phase.

It is well known in the art that in general the polymerization of organic monomers results in the formation of polymer molecules having a considerable range of molecular weights.

For instance, when polyethylene is prepared by conventional high pressure polymerization techniques, some of the molecules have a molecular weight as low at 1000, and others attain weights of 1,000,000 or even greater. Similarly, in low pressure polymerization methods such as those employing Ziegler type catalysts, low molecular weight portions are formed which increase the brittle temperature and impair the stress-crack resistance and impact strength of the polymeric product. In addition it has been noted that low molecular weight polymers have a tendency to react with certain halogen-containing catalyst fragments to form corrosive organic halides which damage metal fabricating equipment.

Low molecular weight polymer impurities in plastic compositions may also arise from other sources than those associated with initial monomer polymerization. For example, when a polymer such as polyethylene prepared by high-pressure techniques is subjected to controlled pyrolysis in order to preferentially break down the very high molecular weight polymer chains, some very low molecular weight oils and greases are produced probably due to the presence of branch chains on the original polymer. These oils and greases impart an objectional odor to the pyrolyzed product and impair important physical properties as well.

Several methods have heretofore been proposed to eliminate these low molecular weight impurities. Some success has ben achieved in preventing the initial formation of these impurities during the polymerization reaction by carefully selecting the reactants and catalysts and carefully controlling the reaction conditions. This general approach is however by no means universally possible or even desirable. In the case of those monomeric materials which do lend themselves to carefully regulated special reaction conditions, the advantages to be gained by directly obtaining polymers having more uniform molecular weights are for the most part offset by increased production costs. The higher costs result from a combination of such factors as lower yields and the necessity for using specialized apparatus and reactants.

More commonly resorted to are those methods which attempt to remove the low molecular weight portions after they are formed during the polymerization reaction. One such method formerly proposed is that of solid phase slurrying in which the polymer in the form of a relatively fine powder, i.e. about 20 mesh, is slurried with a solvent. Since a low molecular weight polymer of a given type is generally more soluble at low temperatures than a high molecular weight polymer of the same type, it is possible to selectively dissolve out the low molecular weight molecules by carefully controlling the temperature of extraction. The method is however difficult and inefficient, particularly where crystalline polymers such as poly(alpha olefins) are involved. The difficulty lies mainly in maintaining the temperature within narrow critical limits over long periods of time. The method is inefficient in that the polymer must be in contact with the solvent for a period sufficient to permit the low molecular weight molecules to diffuse through the crystalline matrix to the surface to contact the solvent. This diffusion process is notoriously slow in crystalline systems.

According to another method commonly called vacuum stripping, the resin is subjected to a milling operation carried out under vacuum conditions. Generally, however, only the most volatile low molecular weight components are removed leaving a certain portion of polymers having molecular weights low enough to adversely affect the physical properties of the resin mass. Moreover, the process is generally slow. In order for the low molecular weight molecules to be vaporized, sufficient time must be allowed for them to diffuse to the surface of the resin mass and evaporate. Invariably some of the low molecular weight constituents remain trapped in the resin.

It is therefore the general object of the present invention to provide a method for removing low molecular weight fractions from polymeric masses which avoids the difficulties and disadvantages of prior known methods.

It is a more particular object to provide a method of selectively extracting the low molecular weight polymer fraction from normally solid and normally crystalline poly(alpha olefins).

According to the present invention, low molecular weight polymer chains normally present in a crystalline polymeric mass can be extracted from said polymer mass by a process which includes the step of intimately contacting the polymer mass in the molten state with an inert liquid solvent in which the polymer chains of low molecular weight are completely soluble and in which the high molecular weight polymer fraction is only swollen, i.e., substantially insoluble. By employing such a selective solvent, the extraction system ultimately gives rise to the formation of two phases, one phase being for the most part the low molecular weight polymer fraction dissolved in the solvent, and the other phase being essentially the molten higher molecular weight fraction or bulk of the resin mass containing imbided solvent. Because of the swelling of the crystalline resin mass by the solvent, the low molecular weight constituents diffuse quickly from within the higher molecular weight polymer mass to rapidly establish equilibrium conditions. The greatly improved efficiency of extraction and speed of extraction and speed of the overall process is attributable to the molten state of this bulk of the resin mass which facilitates the diffusion of low molecular weight polymer chains therethrough.

The polymeric materials found to be suitably employed in the practice of the present invention are hereinafter in the specification and in the claims identified as the normally solid crystalline polymers of lower olefins, i.e., those olefins containing not more than 3 carbon atoms, which term is intended to include the normally solid crystalline homopolymers of ethylene and propylene, the normally solid crystalline ethylene-propylene copolymers, and the normally solid crystalline copolymers and interpolymers of lower olefins containing polymerized therein in addition to ethylene and propylene not more than about 25 percent by weight of a monomeric vinyl compound containing the characteristic

radical and particularly those vinyl compounds having the general formula:

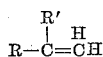

wherein R is selected from the group consisting of halogen, aryl, cyano, alkyl and carboxylate radicals, and R' is either hydrogen, halogen or an alkyl group containing from 1 to 6 carbon atoms. Illustrative of this vinyl monomer group, but in no way limitative thereof, are vinyl chloride, vinylidene chloride, vinyl bromide, styrene, α-methyl styrene, acrylonitrile, alkyl acrylates such as methyl acrylate and ethyl acrylate, and alkyl methacrylates such as methyl methacrylate. The process is applied with particular advantage to polymeric masses of the aforesaid lower olefin polymer masses which contain a minor amount of polymer molecules having a molecular weight less than 1500 and a major amount of molecules having molecular weights in excess of 1500, and preferably in excess of 3000. By major amount is meant at least greater than 50 percent by weight and preferably at least 90 percent by weight.

Suitable solvents for use in this process are advantageously defined and described in terms of their solvent effect upon eicosane, an empirically chosen straight chain paraffin hydrocarbon having 20 carbon atoms. Eicosane closely approximates in solubility characteristics the low molecular weight polymer fraction of polyethylene, polypropylene and the aforesaid copolymers of same. In addition, eicosane is readily available as a standardized material. It is therefore possible to determine whether a given solvent has sufficient solvent power for the purpose of this invention by testing the solubility of eicosane in the solvent selected. The solvent must be capable of dissolving eicosane to the extent of at least 10 grams per liter at a temperature of not greater than 200° C. If this requirement is fully met, the solvent is additionally tested to determine its solvent power with respect to crystalline lower olefin polymer molecules having molecular weights of 10,000 or greater. If substantially none of this high molecular weight polymeric material dissolves in the solvent at temperatures of 200° C. or below, the solvent is considered to have suitable solvent characteristics for the present process.

A particularly preferred class of organic solvents which satisfy the eicosane solubility requirements are those which have the general formula:

$$RO—CH_2CH_2OCH_2CH_2OR'$$

wherein R and R' are each either hydrogen or an alkyl group containing from 1 to 6 carbon atoms.

Other suitable solvents include those which correspond to the general formula:

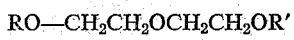

in which R, and R' and R'' are each either hydrogen or an alkyl group having from 1 to 6 carbon atoms, preferably 1 to 4.

Specific compounds illustrative of the solvents are dimethyl adipate; diethyl adipate; methyl ethyl adipate; 2,4-pentanediol; 2-phenoxyethanol; 2(2-ethoxyethoxy)-ethyl acetate; bis(2-ethoxyethyl)ether; 2(2-butoxyethoxy)-ethanol; 2(2-propoxyethoxy)ethanol; 2(2-ethoxyethoxy)-ethanol, 2(2-methoxyethoxy)ethanol, and 2-ethyl-1,3-hexanediol. As will be readily apparent to those skilled in the art, a wide variety of well-known and commercially available solvents can be employed in the present process in addition to the compounds specifically enumerated above.

The relative proportion of solvent to resin employed is not narrowly critical. However, since in swelling, the bulk of the resin mass imbibes some of the solvent, a volume ratio of solvent to resin of at least 0.8:1 should be used in order to ensure the establishment of a two-phase system during the actual extraction operation. The maximum ratio is determined solely by considerations of economics and handling. The preferred ratio range of solvent to resin on a weight basis is from 1:1 to about 4:1, with the ratio of 2:1 being particularly preferred.

In carrying out the present invention the resin mass containing the low molecular weight impurities is heated to a temperature between the minimum fluxing point of the resin mass and its decomposition temperature in contact with an organic solvent capable of dissolving those polymers having a molecular weight of 1500 or less to the extent of at least 5 grams per liter of the solvent at a temperature of 200° C. or less and at the same time being a non-solvent for the bulk of the resin mass. The higher molecular weight portions do not dissolve but merely swell in the presence of the solvent.

The extraction may be carried out in any convenient apparatus capable of agitating the solvent-resin system and maintaining a predetermined temperature during the extraction. A simple autoclave equipped with a stirrer has been found to be entirely adequate for batch type operation. For continuous extraction screw-type mills such as are described in detail in U.S. Patent No. 2,543,307, are advantageously employed. These types of apparatus provide for simultaneous milling and washing of the polymer mass.

Regardless of the apparatus used, it is necessary only that the polymer mass in the molten state be contacted with the solvent to form a two-phase solvent, and that this two-phase system be agitated so that contact of the solvent with the low molecular weight polymer chains is made possible. By "molten state" as used herein is meant that condition of the two component resin-solvent system in which a liquid, non-rigid condition, exerts, i.e., at a temperature at which the crystallinity, which can be detected by X-ray or other means, is removed and the polymer is amorphous. Thus the temperature of the system during extraction may be anywhere in the range from the minimum fluxing temperature of the resin up to the decomposition temperature of the resin or the solvent. It is preferred however to maintain the temperature at least 30° C. and not more than about 220° C. above the minimum fluxing temperature. By minimum fluxing temperature is meant that temperature at which a normally solid polymer mass exhibits what is termed in the art liquid flow. Such liquid flow need not however be Newtonian in character. When solution of the low molecular weight fraction of the resin mass in the solvent phase is complete, the resin phase is separated from the solvent phase by decanting, filtering or other conventional means. The swollen resin mass is then milled under vacuum conditions to remove the imbibed solvent.

It has also been found that greater efficiency of operation may be accomplished by using a true solvent for the total resin mass in addition to the extracting solvents hereinbefore described which only swell the high molecular weight portion of the total resin mass. Such "true" solvent are advantageously heated in admixture with the extracting solvent and the resin mass for the purpose of first obtaining a uniform, single phase solution. Once this solution has been accomplished, the "true" solvent is evaporated off, permitting the high molecular weight portion of the resin mass to precipitate and leaving the low molecular weight portion in solution in the extracting solvent remaining. The embodiment of the general process permits maximum contact of the extracting solvent with the low molecular weight portion of the molten polymer mass. It is especially advantageous in those instances when adequate means to agitate or stir the extracting solvent-molten polymer mixture are not available.

The following examples are illustrative of the present invention:

EXAMPLE I

To a 2 liter glass reactor equipped with stirring and heating means was charged 700 ml. of 2(2-methoxyethoxy)ethanol, 1.0 grams of ditertiary butyl paracresol (an antioxidant) and 242.3 grams of polyethylene having an average molecular weight of about 10,000 and prepared by the polymerization of ethylene in the presence of a Ziegler catalyst consisting of tributyl aluminum and titanium tetrachloride. The mixture was heated to 190° C. and stirred for 15 minutes. At the end of this period of time, the solvent phase was decanted and upon cooling the decanted phase, a flocculent precipitate of low molecular weight resin formed in the amount of about 2.1 grams. Analysis of the smaller resin phase indicated that about 97 grams of 2(2-methoxyethoxy)-ethanol had been imbibed by the originally charged quantity of polyethylene.

EXAMPLE II

A series of three extraction experiments was carried out using 2(2-ethoxyethoxy)ethyl acetate, 2(2-butoxyethoxy)ethanol, and dimethyl adipate respectively in combination with toluene to extract the low molecular weight polymer fraction from a normally solid crystalline ethylene homopolymer having an average molecular weight of about 10,000. In each experiment, 300 ml. of toluene and 300 ml. of the extractant solvent to be tested were added to 150 grams of the polyethylene in a vessel provided with a reflux condenser. The mixtures were then heated under reflux conditions until the polyethylene was completely dissolved. The toluene was then all removed by distillation. The materials remaining in the vessel thereupon separated into a resin rich phase consisting of high molecular weight polyethylene containing imbibed extractant solvent containing dissolved low molecular weight polyethylene. After heating the two phases for about 5 minutes at 200° C. the low viscosity phase containing the excess extractant solvent and low molecular weight polymer molecules was decanted off. Analysis of each of the two phases in each of the three experiments is set forth in Table I below.

*Table I*

| Solvent | Composition (grams) | | | | Low Molecular Weight resin removed (percent) from original resin sample |
|---|---|---|---|---|---|
| | Resin Rich Phase | | Solvent Rich Phase | | |
| | Resin | Solvent | Resin | Solvent | |
| 2(2-ethoxyethoxy)ethyl acetate | 147.83 | 185 | 2.17 | 117 | 1.44 |
| 2(2-butoxyethoxy)ethanol | 147.37 | 192 | 2.63 | 95 | 1.75 |
| dimethyl adipate | 148.04 | 170 | 1.96 | 149 | 1.30 |

EXAMPLE III 150 grams of a normally solid polypropylene having an average molecular weight of about 180,000 was added to 300 ml. of 2(2-ethoxyethoxy)ethyl acetate in an open vessel, heated to 191° C. and slowly stirred for a period of one hour. At the end of this extraction period, the solvent rich phase was separated by hot decantation and weighed after cooling. The low molecular weight polymer fraction which precipitated from the extractant upon cooling was isolated by filtration, washed with water, dried and weighed. The low molecular weight fraction extracted was found to constitute about .88 percent by weight of the initial polymer mass.

EXAMPLE IV

The procedure and formulation of Example III was repeated with the exception that a normally solid crystalline copolymer of ethylene and propylene having a melt index (10X) of about 4.2 at 440 p.s.i. and an average molecular weight of above 100,000 and containing about 3.4 percent propylene copolymerized therein. The low molecular weight fraction extracted was found to constitute about .79 percent by weight of the initial polymer mass.

This application is a division of our copending application Serial No. 851,979, filed November 10, 1959, now Patent No. 3,088,936.

What is claimed is:

1. The process for removing the low molecular weight polymer fraction from a normally solid crystalline lower olefin polymer mass comprising a major fraction of high molecular weight polymer molecules having a molecular weight above 1500 and a minor fraction of low molecular weight molecules having a molecular weight below 1500 which comprises intimately contacting said polymer mass in the molten state with an inert organic liquid extractant selected from the group consisting of dimethyl adipate, methyl ethyl adipate, diethyl adipate, and 2(2-ethoxyethoxy)ethyl acetate, in which extractant the said low molecular weight polymer molecules are completely soluble and in which the said high molecular weight polymer molecules are insoluble, said inert organic liquid extractant and said original polymer mass being present in a volume ratio of at least 0.8:1, and thereafter separating the insoluble fraction of the original polymer mass from the organic liquid extractant containing the low molecular weight polymer fraction dissolved therein.

2. The process according to claim 1 wherein the volume ratio of said inert organic liquid extractant to said original polymer mass present is from 1:1 to about 4:1.

3. The process according to claim 2 wherein the inert organic liquid extractant is dimethyl adipate.

4. The process according to claim 2 wherein the inert organic liquid extractant is diethyl adipate.

5. The process according to claim 2 wherein the inert organic liquid extractant is methyl ethyl adipate.

6. The process according to claim 2 wherein the inert organic extractant is 2(2-ethoxyethoxy)ethyl acetate.

No references cited.